(12) United States Patent
van de Wiel

(10) Patent No.: US 10,038,606 B2
(45) Date of Patent: *Jul. 31, 2018

(54) BROADBAND MODEM WITH CHANNEL LEARNING AND METHODS FOR USE THEREWITH

(71) Applicant: BROADCOM CORPORATION, Irvine, CA (US)

(72) Inventor: Olivier van de Wiel, Brussels (BE)

(73) Assignee: AVAGO TECHNOLOGIES GENERAL IP (SINGAPORE) PTE. LTD, Singapore (SG)

(*) Notice: Subject to any disclaimer, the term of this patent is extended or adjusted under 35 U.S.C. 154(b) by 124 days.

This patent is subject to a terminal disclaimer.

(21) Appl. No.: 15/075,598

(22) Filed: Mar. 21, 2016

(65) Prior Publication Data

US 2016/0204989 A1 Jul. 14, 2016

Related U.S. Application Data

(63) Continuation of application No. 14/523,501, filed on Oct. 24, 2014, now Pat. No. 9,338,069.

(60) Provisional application No. 61/913,616, filed on Dec. 9, 2013, provisional application No. 62/063,632, filed on Oct. 14, 2014.

(51) Int. Cl.
*H04L 12/26* (2006.01)
*H04L 12/24* (2006.01)
*H04B 7/185* (2006.01)

(52) U.S. Cl.
CPC ............ *H04L 43/06* (2013.01); *H04B 7/185* (2013.01); *H04L 41/12* (2013.01); *H04L 41/32* (2013.01); *H04L 43/08* (2013.01)

(58) Field of Classification Search
CPC ... H04B 1/38; H04B 1/69; H04B 3/32; H04B 7/14; H04L 5/023; H04L 12/24; H04L 12/26; H04L 12/28; H04L 25/0206; H04L 41/12; H04L 43/06
See application file for complete search history.

(56) References Cited

U.S. PATENT DOCUMENTS

| | | | | |
|---|---|---|---|---|
| 4,761,796 A * | 8/1988 | Dunn | ........................ | H04B 1/69 375/133 |
| 7,158,484 B1 * | 1/2007 | Ahmed | .................. | H04W 72/02 370/254 |
| 2008/0063044 A1 * | 3/2008 | Iida | ..................... | H03K 5/00006 375/238 |
| 2008/0175332 A1 * | 7/2008 | Coon | .................. | H04L 25/0206 375/267 |
| 2008/0235311 A1 * | 9/2008 | Budianu | ................. | H04L 5/023 708/290 |

(Continued)

*Primary Examiner* — Andrew Lai
*Assistant Examiner* — Leon Andrews
(74) *Attorney, Agent, or Firm* — Garlick & Markison; Bruce E. Stuckman

(57) ABSTRACT

Aspects of the subject disclosure may include, for example, a channel learning entity is configured to receive a priori network data via a transceiver. The channel learning entity generates at least one measurement of the communication environment based on the a priori network data, and generates first report data for transmission via the transceiver based on the at least one measurement of the communication environment. Other embodiments are disclosed.

20 Claims, 5 Drawing Sheets

(56) References Cited

U.S. PATENT DOCUMENTS

2012/0026908 A1\* 2/2012 Tzannes ................. H04L 41/12
370/252
2013/0215935 A1\* 8/2013 Nuzman ................. H04B 3/32
375/219

\* cited by examiner

BROADBAND MODEM WITH CHANNEL LEARNING AND METHODS FOR USE THEREWITH

CROSS REFERENCE TO RELATED PATENTS/PATENT APPLICATIONS

The present U.S. Utility Patent Application claims priority pursuant to 35 U.S.C. § 120 as a continuation of U.S. Utility application Ser. No. 14/523,501, entitled "BROADBAND MODEM AND NETWORK TERMINATION WITH CHANNEL LEARNING AND METHODS FOR USE THEREWITH", filed Oct. 24, 2014, now U.S. Pat. No. 9,338,069, which claims priority pursuant to 35 U.S.C. § 119(e) to U.S. Provisional Application No. 61/913,616, entitled "BROADBAND MODEM WITH CHANNEL LEARNING AND METHODS FOR USE THEREWITH", filed Dec. 9, 2013, and U.S. Provisional Application No. 62/063,632, entitled "BROADBAND MODEM AND NETWORK TERMINATION WITH CHANNEL LEARNING AND METHODS FOR USE THEREWITH", filed Oct. 14, 2014, all of which are hereby incorporated herein by reference in their entirety and made part of the present U.S. Utility Patent Application for all purposes.

BACKGROUND

Technical Field

The various embodiments relate generally to communication systems; and to point-to-multipoint communication systems with modems or other broadband devices.

Description of Related Art

In conventional point-to-multipoint communication systems, a network supports bidirectional data communication between a central entity and multiple customer premises equipment (CPE). Example point-to-multipoint communication systems include cable networks, digital subscriber line (DSL) network, mobile wireless systems, fixed wireless systems, and satellite communication systems. In each system, the communication path from the central entity to the CPE is typically referred to as the downstream, while the communication path from the CPE to the central entity is typically referred to as the upstream.

CPE such as a broadband modems or other broadband devices generally obtain their operational transmission parameters from the network, through the far-end line termination equipment (LT/LTE), also referred to as central office (CO), cable modem termination system (CMTS) or digital subscriber line access multiplexer (DSLAM) in the context of the DSL network. CPE units have little knowledge a priori about the spectral compatibility rules that will apply to them. This is especially true when the same CPE units are shipped and used over multiple deployment areas, but also applies when the units are not configured for spectral compatibility from inventory.

DETAILED DESCRIPTION

Figure 1:
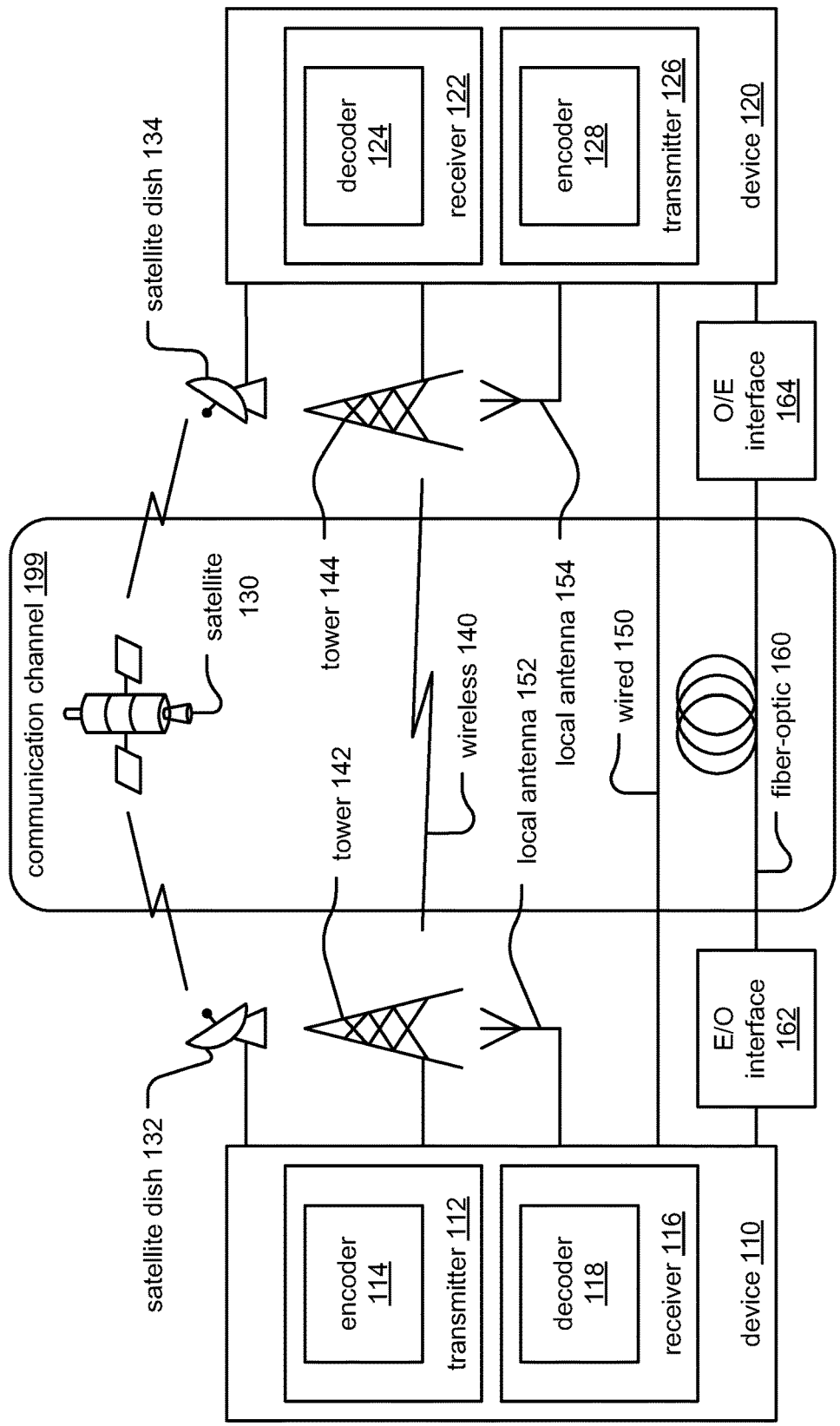
FIG. 1 illustrates a block diagram representation of an embodiment 100 of a communication system.

FIG. 1 illustrates an embodiment 100 of a communication system. In particular, communication system 100 is a communication channel 199 that communicatively couples a communication device 110 (including a transmitter 112 having an encoder 114 and including a receiver 116 having a decoder 118) situated at one end of the communication channel 199 to another communication device 120 (including a transmitter 126 having an encoder 128 and including a receiver 122 having a decoder 124) at the other end of the communication channel 199.

In some embodiments, either of the communication devices 110 and 120 may only include a transmitter or a receiver. There are several different types of media by which the communication channel 199 may be implemented (e.g., a satellite communication channel 130 using satellite dishes 132 and 134, a wireless communication channel 140 using towers 142 and 144 and/or local antennas 152 and 154, a wired communication channel 150, and/or a fiber-optic communication channel 160 using electrical to optical (E/O) interface 162 and optical to electrical (O/E) interface 164)). In addition, more than one type of media may be implemented and interfaced together thereby forming the communication channel 199.

It is noted that such communication devices 110 and/or 120 may be stationary or mobile without departing from the scope and spirit of the various embodiments. For example, either one or both of the communication devices 110 and 120 may be implemented in a fixed location or may be a mobile communication device with capability to associate with and/or communicate with more than one network access point (e.g., different respective access points (APs)) in the context of a mobile communication system including one or more wireless local area networks (WLANs), different respective satellites in the context of a mobile communication system including one or more satellite, or generally, different respective network access points in the context of a mobile communication system including one or more network access points by which communications may be effectuated with communication devices 110 and/or 120. Any of the various types of coding can be employed within any such desired communication system (e.g., including those variations described with respect to FIG. 1), any information storage device (e.g., hard disk drives (HDDs), network information storage devices and/or servers, etc.) or any application in which information encoding and/or decoding is desired.

In accordance with various embodiments, the device 110 or 120 implements a broadband modem or other broadband device having a channel learning entity. Further details regarding the implementation of such a modem including several optional functions and features will be described in FIGS. 2-6 that follow.

Figure 2:
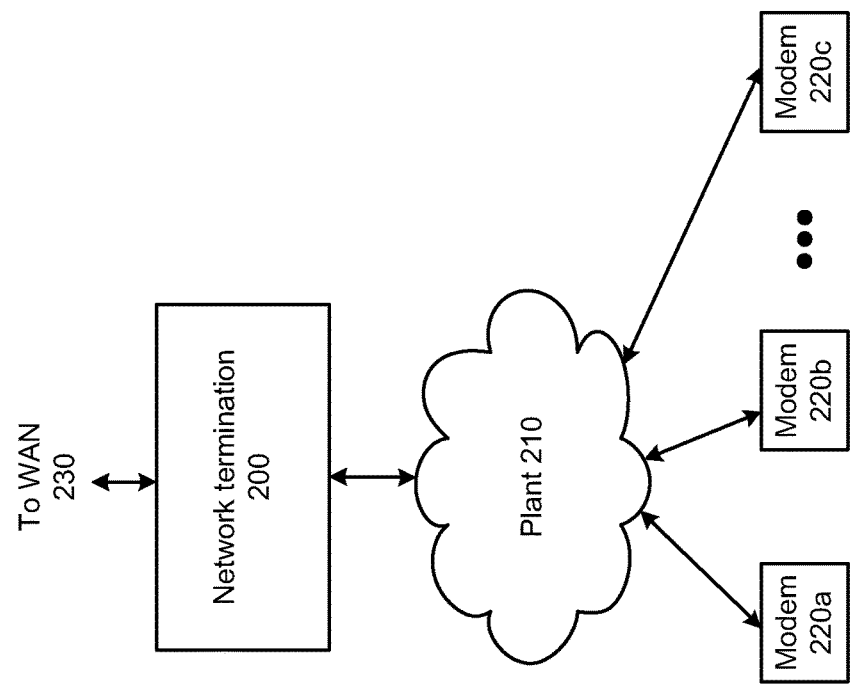
FIG. 2 illustrates a block diagram representation of an embodiment of a communication system.

FIG. 2 illustrates an embodiment of a communication system. A particular embodiment of communication system 100 is presented as a system that provides bidirectional communication between a network termination 200 at the far-end of a plant 210 that provides a communication environment with a plurality of modems (220a, 220b, 220c . . . ). The network termination 200 is coupled to a wide area network 230 such as the Internet, an intranet, extranet or other network. In an embodiment, the network termination 200 is a digital subscriber access line multiplexer (DSLAM), the modems 220a, 220b, 220c . . . are DSL modems and the plant 210 is a digital subscriber line network such as a telephone network or other DSL network. In this embodiment, the DSLAM and modems 220a, 220b, 220c . . . communicate via an xDSL protocol.

In a further embodiment, the network termination 200 is a CMTS, the modems 220a, 220b, 220c . . . are cable modems and the plant 210 includes a cable plant. In this embodiment, the CMTS 200 and cable modems 220a, 220b, 220c . . . operate in accordance with a DOCSIS protocol or other cable modem protocol such as DOCSIS 3.0, DOCSIS 3.1 or other cable communication protocol.

In yet another embodiment, the network termination 200 is a 4G eNodeB, the plant 210 is a wireless network environment and the modems 220a, 220b, 220c . . . are components of 4G mobile devices. In this embodiment, the network termination 200 and modems 220a, 220b, 220c . . . communicate via a 4G protocol such as long-term evolution (LTE) or other wireless communication protocol.

The modems 220a, 220b, 220c . . . include a channel learning entity as discussed in conjunction with FIG. 1. This channel learning entity operates as an agent to measure the communication environment of the modems 220a, 220b, 220c . . . while minimizing the impact to other modems 220a, 220b, 220c . . . communicating with the network termination 200.

Figure 3:
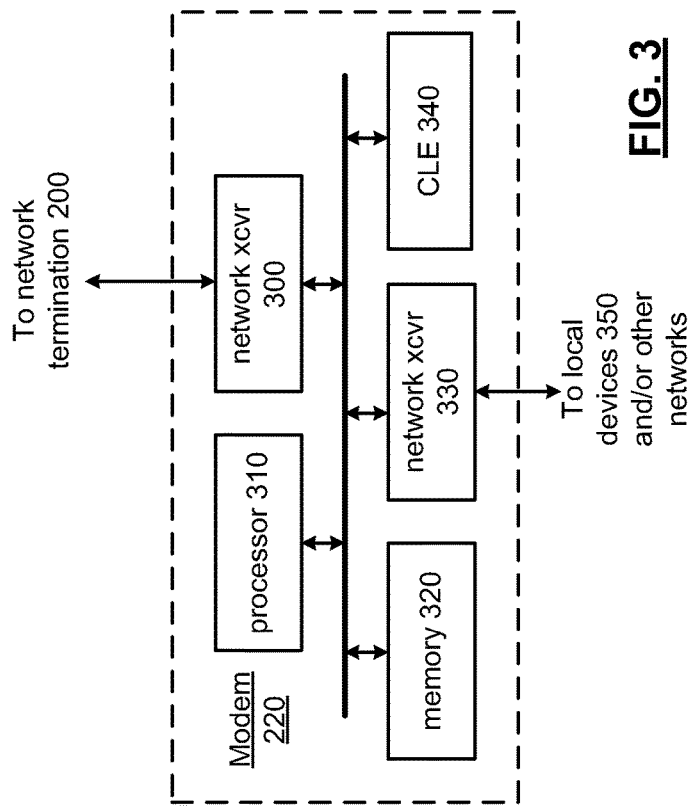
FIG. 3 illustrates a block diagram representation of an embodiment a modem 220.

FIG. 3 illustrates an embodiment a modem 220. In particular, a modem 220x (such as any of the modems 220a, 220b, 220c) includes a processor 310 that operates in conjunction with memory 320. A network transceiver 300 communicates with network termination 200 via plant 210. A network transceiver 330 couples to local devices 350 and/or to other networks via a connection such as an Ethernet connection, Firewire connection, USB connection, Bluetooth connection or other connection, either wired or wireless. As shown, the processor 310, channel learning entity (CLE) 340, memory 320, network transceiver 330 and network transceiver 300 are coupled via a bus architecture. While a particular bus architecture is shown, other connectivity between the modules of modem 220x can be effectuated including other bus architectures and direct connectivity between two or more modules. Further, the modem 220x optionally includes additional components that are not specifically shown.

The processor 310, CLE 340, network transceiver 300 and network transceiver 330 can each be implemented via one or more shared processing devices, by one or more dedicated processing devices or otherwise via a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing device may have an associated memory, such as memory 320 and/or an integrated memory element, which may be a single memory device, a plurality of memory devices, and/or embedded circuitry of the processing module, module, processing circuit, and/or processing unit. Such a memory device may be a read-only memory (ROM), random access memory (RAM), volatile memory, non-volatile memory, static memory, dynamic memory, flash memory, cache memory, and/or any device that stores digital information. Note that if the processor 310, CLE 340, network transceiver 300 and network transceiver 330 are implemented by more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processor 310, CLE 340, network transceiver 300 and network transceiver 330 implement one or more of their functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processor 310, CLE 340, network transceiver 300 and network transceiver 330 may execute, hard coded and/or operational instructions corresponding to at least some of the steps and/or functions illustrated in one or more of the Figures. Such a memory device or memory element can be included in an article of manufacture.

The channel learning entity 340 operates as an agent to measure the communication environment of the modem 220x while minimizing the impact to other modems 220x communicating with the network termination 200. In an embodiment, the channel learning entity 340 operates as an agent, such as a software agent, to collect data from different sources and control the modem 220x to send and receive a series of signals aimed at measuring the communication environment between the modem 220x and the network termination 200. In an embodiment, the channel learning entity 340 also receives a priori network data via the network transceiver 300 or network transceiver 330. The channel learning entity 340 can generate and/or analyze the measurements based on the a priori network data and generate report data to the network termination 200 and/or other relevant management entities for network management purposes. While the CLE 340 is shown as a separate component device that is coupled to the network transceiver 300 via a data bus, the CLE 340 can be directly coupled to the network transceiver 300 or implemented as a component of the network transceiver 300.

In an embodiment, the a priori network data includes at least one of: a network type; a network topology; a noise measurement; a combined measurement including noise and echo or other signal reflected back to the transceiver; another combined signal and noise measurement such as a signal to noise ratio, or signal to noise and interference ratio; a crosstalk pattern; or a power spectral density band plan. The a priori network data can be generated based on second report data from another broadband device, such as prior broadband device being replaced by the current broadband device.

In an embodiment, the measurement(s) of the communication environment include measurement of a single-ended local noise shape, and the channel learning entity generates an estimate of channel topology based on the single-ended local noise shape. The estimate of channel topology can include a frequency location of an upstream band, a frequency location of a downstream band, or an indicator of distance to a network termination.

In an embodiment, the measurement(s) of the communication environment include generating a plurality of partial band measurements of a composite band and/or generating a wideband measurement based on a pseudo random bit sequence. The communication environment can include at least one communication line and a plurality of neighboring lines and wherein a power level of the wideband measurement is less than a standard transmit power level, but sufficiently high enough to be visible on the plurality of neighboring lines.

Consider an example where the modem 220x is an xDSL modem that operates in accordance with the G.SELT ITU standard G.996.2 and the network termination 200 is a DSLAM. In an embodiment, the channel learning entity 340 is operative to receive, via network transceiver 300, a priori network data. Examples of such a priori network data include cable or other network communication types, cable or other network topologies, expected far-end and/or near-end crosstalk patterns, local power spectral densities, band plans and other spectral information and/or other data that can be used as estimates or used to determine estimates of the communication environment. Consider further that the network termination 200 is coupled to a wide-area network 230 such as the Internet. The a priori network data can be obtained from a service providers' specific data server able to provide this information or stored locally on the network termination 200. For example, a priori network data relating to a network environment can be obtained by a modem 220x when connected to a data network through a data relay, when replacing an existing modem that had collected and reported prior environmental data, based on default network environmental data or more generally based on other current or recent network environmental data that has been collected or derived by other devices and that may provide an estimate of the network environment of the modem 220x or otherwise be used to generate an estimate of the network environment of the modem 220.

In addition to the collection of a prior network data, the modem 220x also can make its own local measurements. In an embodiment, the channel learning entity 340 controls the network transceiver 300 to generate a single-ended measurement to infer a power spectral density (PSD) shape. For example, a two-step approach can be employed wherein the channel learning entity 340 first controls the network transceiver 300 to measure the single-ended local noise spectrum. In DSL access networks, this noise shape is governed by far-end crosstalk (FEXT) and near-end cross talk (NEXT) effects. In the second step, the channel learning entity 340 can employ a curve fitting approach or other estimation technique along with a crosstalk model (and optionally based on a priori network data, when available) to estimate the frequency location of the upstream and downstream bands, to infer the lower and upper bounds on the modem's distance to the network termination 300, estimates of the upstream bands, a level of transmit PSD the transceiver 300 can use to estimate the loop/channel topology, and to estimate other environmental data. This technique is particularly well suited for xDSL transceivers and other transceivers 300 where the frequency shaping can be a basic feature of signal generation circuitry and software.

In one mode of operation, the channel learning entity 340 commands the transceiver 300 to employ narrow-band measurements. For example, a series of partial measurements can be performed to estimate a wide band signal in order to minimize the impact on neighboring established connections. In this fashion, the level and bandwidth extension of the perturbation induced on other lines can be correctable by the error protection scheme used of these other modems 220, and data and/or traffic errors can be reduced or eliminated entirely. This allows faster and more accurate single ended measurements than when traditional conservative transmit signal characteristics (PSD limits, transmission duration) are used. In addition, the narrowband measurements can lead to a better channel topology estimation.

In a further mode of operation, the channel learning entity 340 can measure or estimate channel topology discovery via a wideband signal with a very low level. An example of such a wideband signal is a signal that uses spread spectrum orthogonal frequency division multiplexing (SS-OFDM) in order to limit the transmit signal to a level that's low enough to be invisible or visible on neighboring lines. The pseudo-random bit sequence (PRBS) used for such operation can be picked at random and measured once before actually being transmitted in order to minimize the probability that another modem is using the same random signal. If the channel learning entity 340 has access to an information server, the modem 220x can report and the CPE will report used PRBS sequences to the CLE such that other modems 220 connecting through this server, could avoid using the same PRBS.

As discussed above, once the channel learning entity 340 generates environmental estimates in the form of inferred PSD, PRBS, channel/network topology and/or other measurements, estimates and data, the channel learning entity 340 can generate and send report data to the network termination 200, to an information server and/or other relevant management entities for network management purposes. In particular, the report data can include network topology information such as the network distance between the modem 220 and the network termination 200, the number of network segments and/or branches between the modem 220 and the network termination 200, and/or other network topology features. The report data generated by such a modem 220x can be stored in an information server or other network device and used as a priori network data by a modem with a similar network connection such as a replacement modem, a modem at the same or similar location or by other modems with the same or similar communication environment.

Figure 4:
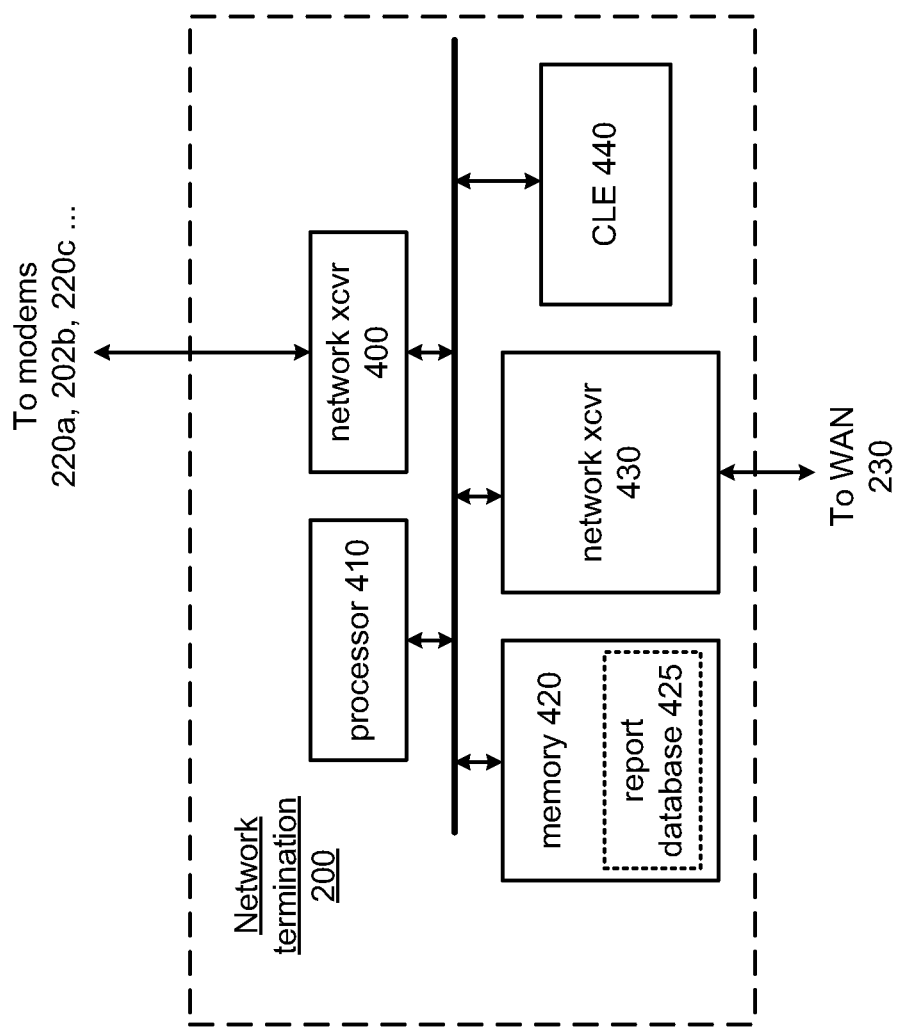
FIG. 4 illustrates a block diagram representation of an embodiment a network termination 200.

FIG. 4 illustrates a block diagram representation of an embodiment a network termination 200. In particular, a network termination 200 includes a processor 410 that operates in conjunction with memory 420. A network transceiver 400 communicates with a plurality of modems 220a, 220b, 220c . . . via a communication environment of plant 210. A network transceiver 430 couples to wide area network 230 via a connection such as an Ethernet connection, USB connection, or other connection, either wireless or wireless. As shown, the processor 410, CLE 440, memory 420, network transceiver 430 and network transceiver 400 are coupled via a bus architecture. The channel learning entity 440 operates to communicate with channel learning entity 340 to receive report data from each of the modems 220a, 220b, 220c . . . for network management purposes. The CLE 440 can optionally perform its own measurements of the communication environment associated with each of the modems 220a, 220b, 220c . . . in a reciprocal fashion. While a particular bus architecture is shown, other connectivity between the modules of modem 220x can be effectuated including other bus architectures and direct connectivity between two or more modules. Further, the modem 220x optionally includes additional components that are not specifically shown.

The processor 410, CLE 440 network transceiver 400 and network transceiver 430 can each be implemented by via one or more shared processing devices, by one or more dedicated processing devices or otherwise via a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing device may have an associated memory, such as memory 420 and/or an integrated memory element, which may be a single memory device, a plurality of memory devices, and/or embedded circuitry of the processing module, module, processing circuit, and/or processing unit. Such a memory device may be a read-only memory (ROM), random access memory (RAM), volatile memory, non-volatile memory, static memory, dynamic memory, flash memory, cache memory, and/or any device that stores digital information. Note that if the processor 410, CLE 440, network transceiver 400 and network transceiver 430 are implemented by more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processor 410, CLE 440, network transceiver 400 and network transceiver 430 implement one or more of their functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processor 410, CLE 440, network transceiver 400 and network transceiver 430 may execute, hard coded and/or operational instructions corresponding to at least some of the steps and/or functions illustrated in one or more of the Figures. Such a memory device or memory element can be included in an article of manufacture.

In an example of operation, the network transceiver 400 is configured to communicate with a plurality of broadband devices such as modems 220a, 220b, 220c . . . via a communication environment, such as plant 210. The channel learning entity 440 is configured to receive report data from the plurality of broadband devices indicating at least one measurement of the communication environment and to store the report data in the report database 425. This report data can be shared with other network devices for network management purposes via WAN 230. When a broadband device is replaced with a new device, the CLE 440 generates a priori network data for the new device based on report data received from the prior broadband device. The network transceiver 400 sends the a priori network data to the new broadband device via the communication environment for use by the CLE 440 of that device.

Figure 5:
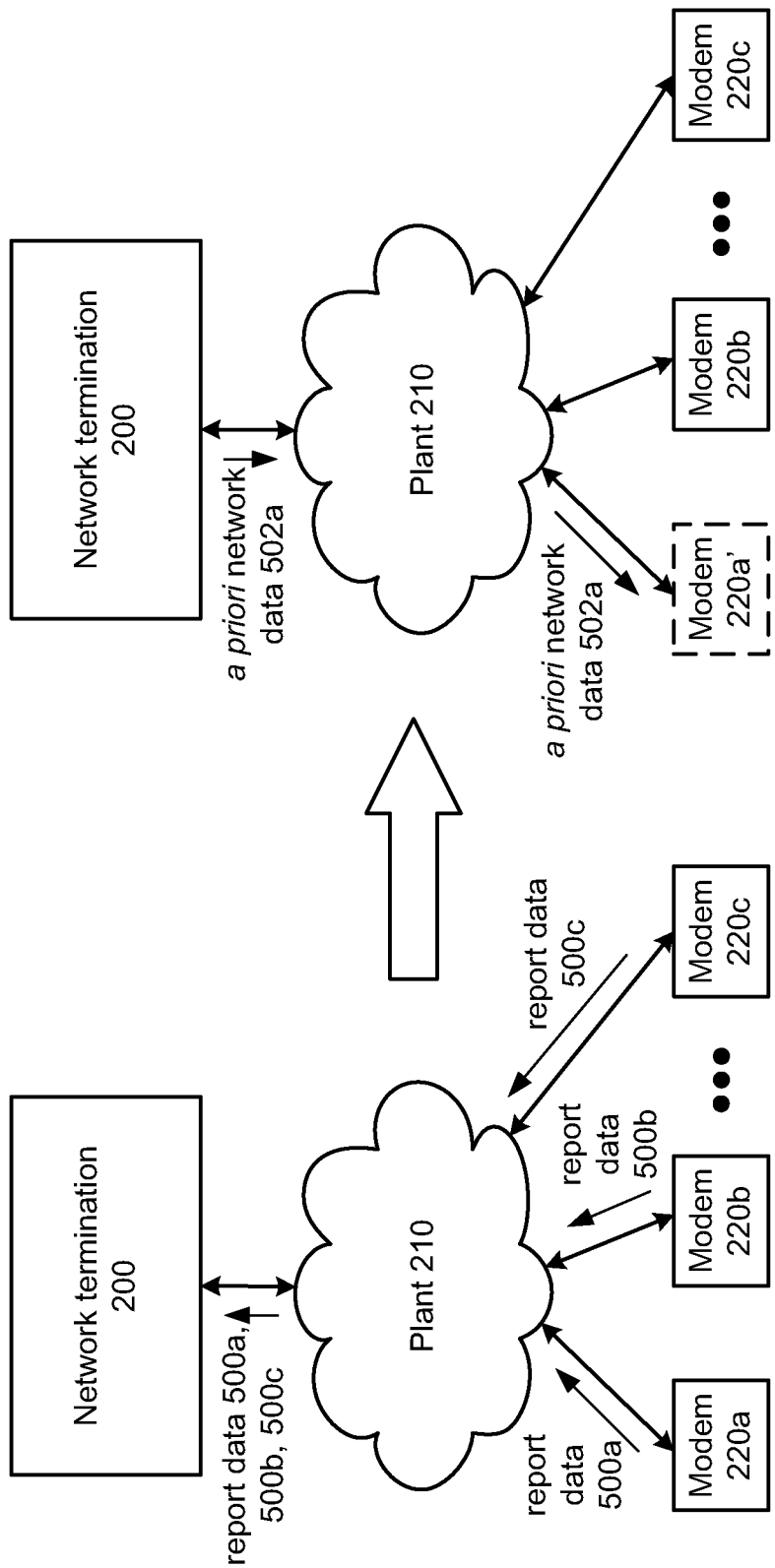
FIG. 5 illustrates a block diagram representation of an embodiment of a communication system.

FIG. 5 illustrates a block diagram representation of an embodiment of a communication system. This diagram includes similar items presented in conjunction with FIGS. 2-4 that are referred to by common reference numerals.

In an example of operation, the network termination 200 is configured to communicate with a plurality of broadband devices such as modems 220a, 220b, 220c . . . via a communication environment. The network termination 200 is configured to receive report data 500a, 500b, 500c . . . from the plurality of broadband devices indicating at least one measurement of the communication environment and to stores the report data 500a, 500b, 500c . . . in a report database, indexed by each device. This report data 500a, 500b, 500c . . . can be shared with other network devices for network management purposes via WAN 230. When a broadband device, such as modem 220a is replaced with a new device 220a', the termination device generates a priori network data 502a for the new device 220a' based on report data 500a received from the prior broadband device 220a. The network termination 200 sends the a priori network data 502a to the new broadband device 220a' via the communication environment for use by the CLE 340 of that device.

While the foregoing description has focused on a priori network data 502a being transmitted to modem 220a' via the plant 210, as discussed in conjunction with FIG. 3, a priori network data can also be received from either the network termination 200 or other network devices via an alternative network connection to the modem 220a, where available.

Figure 6:
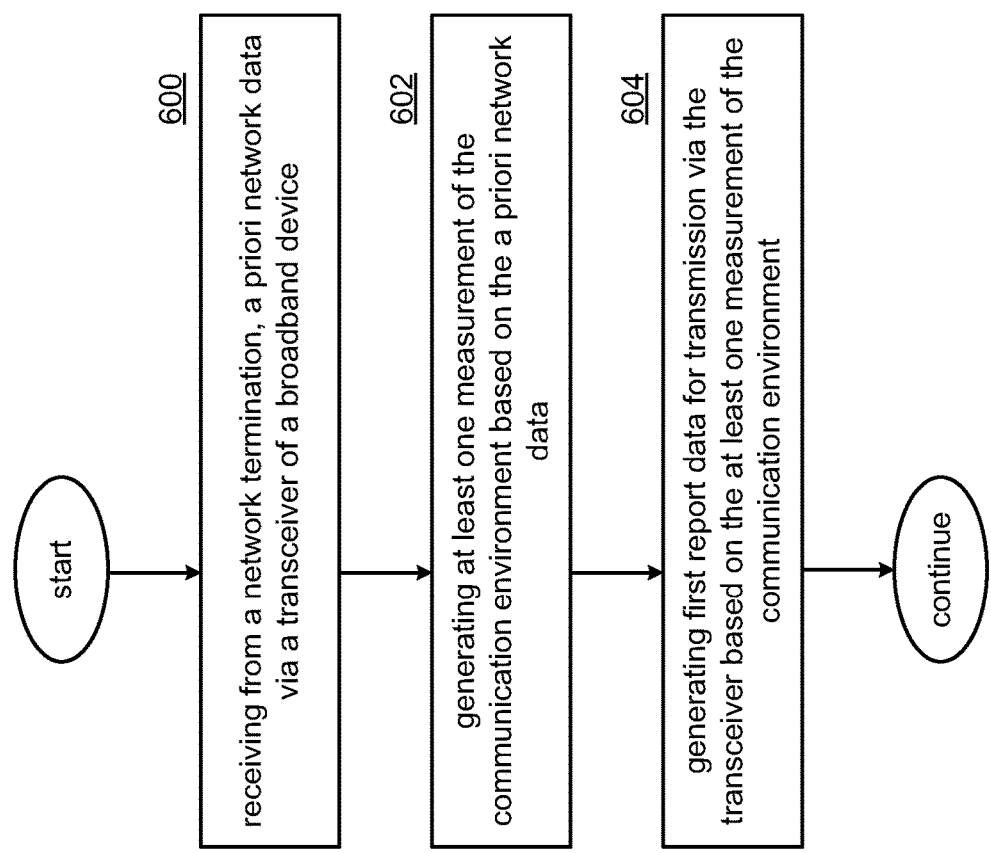
FIG. 6 illustrates a flow diagram representation of an embodiment of a method.

FIG. 6 illustrates a flow diagram representation of an embodiment of a method. In particular, a method is presented for use in conjunction with one or more functions or features described in conjunction with FIGS. 1-5. Step 600 includes receiving from a network termination, a priori network data via a transceiver of a broadband device. Step 602 includes generating at least one measurement of the communication environment based on the a priori network data. Step 604 includes generating first report data for transmission via the transceiver based on the at least one measurement of the communication environment. The communication environment can include a digital subscriber line network, a broadband cable access network, a wireless broadband access network or other network.

In an embodiment, the a priori network data includes at least one of: a network type; a network topology; a crosstalk pattern; or a power spectral density band plan. The a priori network data can be generated based on second report data from another broadband device, such as prior broadband device being replaced by the current broadband device.

In an embodiment, the at least one measurement of the communication environment includes measurement of a single-ended local noise shape, and wherein the channel learning entity generates an estimate of channel topology based on the single-ended local noise shape. The estimate of channel topology can include a frequency location of an upstream band, a frequency location of a downstream band, or an indicator of distance to a network termination.

In an embodiment, the at least one measurement of the communication environment includes generating a plurality of partial band measurements to composite band and/or generating a wideband measurement based on a pseudo random bit sequence. The communication environment can include at least one communication line and a plurality of neighboring lines and wherein a power level of the wideband measurement is less than a standard transmit power level, but sufficiently high enough to be visible on the plurality of neighboring lines.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A broadband device comprising:
at least one transceiver configured to communicate with a network termination via a communication environment; and
a channel learning entity configured to receive a priori network data that includes a network topology, wherein the a priori network data was generated by another broadband device at a time prior to a replacement of the another broadband device by the broadband device, wherein the a priori network data is received, via the transceiver, to generate at least one measurement of the communication environment based on the a priori network data, and to generate first report data for transmission via the at least one transceiver based on the at least one measurement of the communication environment.

2. The broadband device of claim 1 wherein the a priori network data further includes at a network type.

3. The broadband device of claim 1 wherein the a priori network data is generated based on second report data from another broadband device.

4. The broadband device of claim 1 wherein the network topology includes at least one of: a network distance between the another broadband device and the network termination, a number of network segments between the another broadband device and the network termination, or a number of branches between the another broadband device and the network termination.

5. The broadband device of claim 1 wherein the at least one measurement of the communication environment includes measurement of a single-ended local noise shape, and wherein the channel learning entity generates an estimate of channel topology based on the single-ended local noise shape.

6. The broadband device of claim 5 wherein the estimate of channel topology includes one of: a frequency location of an upstream band, a frequency location of a downstream band, or an indicator of distance to the network termination.

7. The broadband device of claim 1 wherein the at least one measurement of the communication environment includes generating a plurality of partial band measurements to composite band.

8. The broadband device of claim 1 wherein the at least one measurement of the communication environment includes generating a wideband measurement based on a pseudo random bit sequence.

9. The broadband device of claim 8 wherein the communication environment includes at least one communication line and a plurality of neighboring lines and wherein a power level of the wideband measurement is less than a standard transmit power level, but sufficiently high to be visible on the plurality of neighboring lines.

10. The broadband device of claim 1 wherein the communication environment includes one of: a digital subscriber line network; a broadband cable access network; or a wireless broadband access network.

11. A method comprising:
receiving from a network termination, a priori network data that includes a network topology, via a transceiver of a broadband device wherein the a priori network data was generated by another broadband device at a time prior to a replacement of the another broadband device by the broadband device;
generating at least one measurement of a communication environment based on the a priori network data; and
generating first report data for transmission via the transceiver based on the at least one measurement of the communication environment.

12. The method of claim 11 wherein the a priori network data further includes a network type.

13. The method of claim 11 wherein the a priori network data is generated based on second report data from another broadband device.

14. The method of claim 11 wherein the network topology includes at least one of: a network distance between the another broadband device and the network termination, a number of network segments between the another broadband device and the network termination, or a number of branches between the another broadband device and the network termination.

15. The method of claim 11 wherein the at least one measurement of the communication environment includes measurement of a single-ended local noise shape, and wherein an estimate of channel topology is generated based on the single-ended local noise shape.

16. The method of claim 15 wherein the estimate of channel topology includes one of: a frequency location of an upstream band, a frequency location of a downstream band, or an indicator of distance to a network termination.

17. The method of claim 11 wherein the at least one measurement of the communication environment includes generating a plurality of partial band measurements to composite band.

18. The method of claim 11 wherein the at least one measurement of the communication environment includes generating a wideband measurement based on a pseudo random bit sequence; and
wherein the communication environment includes at least one communication line and a plurality of neighboring lines and wherein a power level of the wideband measurement is less than a standard transmit power level, but sufficiently high to be visible on the plurality of neighboring lines.

19. The method of claim 11 wherein the communication environment includes one of: a digital subscriber line network; a broadband cable access network; or a wireless broadband access network.

20. A network termination comprising:
a transceiver configured to communicate with a plurality of broadband devices via a communication environment; and
a channel learning entity configured to receive report data from the plurality of broadband devices indicating at least one measurement of the communication environment, to generate a priori network data that includes a network topology for one of the plurality of broadband devices based on report data received from another one of the plurality of broadband devices;

wherein the transceiver sends the a priori network data corresponding to one of the plurality of broadband devices having been replaced to another broadband device that has replaced the one of the plurality of broadband devices in the communication environment.

* * * * *